United States Patent Office 3,004,932
Patented Oct. 17, 1961

---

3,004,932
UNSATURATED β-DIKETONES AND POLYMERS AND CO-POLYMERS THEREOF
Aleksander Despić, Philadelphia, Pa., and Djuro Kosanović, Belgrade, Yugoslavia, assignors to The Dow Chemical Company, Midland, Mich., a corporation of Delaware
No Drawing. Filed Jan. 15, 1958, Ser. No. 708,978
15 Claims. (Cl. 260—2.2)

This invention relates to unsaturated β-diketones and polymers and copolymers thereof having selective ion-exchange properties for ferric ions.

Ion-exchange resins are known that are selective for one or more particular ionic species. However they have the disadvantage that their affinity for the species for which they are selective is generally so great that regeneration by means of another species is very difficult.

The invention is based on the discovery that certain unsaturated β-diketones can be polymerised with a cross-linking agent to form resins which have specific ion-exchange properties but which can readily be regenerated by treatment with acids. These diketones in the monomeric state have a complexing affinity for a number of ionic species in aqueous solution. This complexing affinity is decreasing with decreasing pH value, the buffering range being different for different ionic species. In the pH range below 6 these diketones retain the complexing affinity for ferric ions only, out of a number of ionic species investigated, which makes this affinity relatively selective. The copolymers produced from these unsaturated diketones retain this selective affinity. The monomeric diketones are themselves new and are part of the invention.

The monomeric diketones according to the invention have the general formula $$CR_1R_2=CR_3-(CH_2)_n-CO-CH_2-CO-CH_3$$

in which $R_1$, $R_2$ and $R_3$ denote any aliphatic radical or the hydrogen atom and $n$ is zero or a small whole number. They must, of course, be capable of being polymerised.

In practice, in order that the ketones should be readily polymerisable to hard solid resins $R_1$ and $R_2$ should be hydrogen atoms, while $R_3$ is an alkyl group having not more than 4 carbon atoms and $n=0$ or 1. In a modification of the invention $R_3$ may also be a halogen atom.

The monomeric β-diketones may be made by a Claisen condensation of an ester of an unsaturated aliphatic acid and acetone. The esters used are preferably those of unsubstituted or α-substituted acrylic acid or of β-substituted vinylacetic acid. In a further modification of the invention ketones other than acetone may be used, having one methyl group and one alkyl group $R_4$ having not more than four carbon atoms. However, we prefer to use acetone, since when an unsymmetrical monomethyl ketone $CH_3-CO-R_4$ is used some reaction may occur between the ester and the other alkyl radical $R_4$ to give a mixture of products. These may include the compounds $$CR_1R_2=CR_3-(CH_2)_n-CO-CH_2-CO-R_4$$

and $$CR_1R_2=CR_3-(CH_2)_n-CO-CHR_5-CO-CH_3$$

where $R_5$ is an alkyl group having up to three carbon atoms and these diketones form part of this invention.

The condensation reaction is carried out in the presence of an alkali metal or an alcoholate or amide of an alkali metal.

The ester of the unsaturated acid is preferably stabilised by the addition of a basic polymerisation inhibitor, e.g., p-phenylene diamine or N-dimethyl-α-naphtylamine, to prevent polymerization of the ester or the β-diketone during the reaction. The condensation of the ester with the ketone is preferably carried out with strong cooling and in an inert solvent, e.g., dry ether. It is essential for the success of the whole preparation that the temperature should be kept as low as possible, preferably near 0° C.

The β-diketone may be removed from the reaction mixtures as its alkali metal salt by adding ice or ice-cold water and separating off the aqueous phase, from which the β-diketone itself may be liberated by acidification.

The crude β-diketone monomer may be purified by fractional distillation under reduced pressure and at as low a temperature as possible. However, it can also be converted to its ferric ion complex by repeated extraction with aqueous ferric chloride, the dark red solution can be acidified to decompose the complex, and the β-diketone can be extracted with an organic solvent, e.g., chloroform, which then can be evaporated off at low pressure.

The product obtained generally contains some polymeric β-diketone, which increases its viscosity. The pure monomer can be obtained by distillation under reduced pressure or by fractional crystallisation of the liquid at very low temperature.

One unsaturated ketone according to the invention is methacrylylacetone (1 - hexene - 2 - methyl - 3:5 - dione), which may be made by the condensation of an ester of methacrylic acid, e.g., ethyl methacrylate, with acetone according to the equation:

$$CH_2=C(CH_3)-CO-OC_2H_5+CH_3-CO-CH_3 \rightarrow$$
$$CH_2=C(CH_3)-CO-CH_2-CO-CH_3+C_2H_5OH$$

This preparation is illustrated in the following example:

Example 1

50 ml. of sodium-dried, redistilled ether were put into a 1 l. round-bottom flask and 50 g. of granulated sodium metal (free of oxide film) were added. The flask and contents were cooled in a mixture of ice and water, a reflux condenser was fitted, and 670 ml. of ethylmethacrylate, previously freed from alcohol by repeated washing with water and drying over anhydrous calcium chloride, were added. 170 g. of dried and redistilled acetone were then introduced gradually with vigorous shaking of the flask. A viscous reaction mixture resulted.

The flask containing the reaction mixture was allowed to stand for about 17 hours in the refrigerator and 750 ml. of ice-cold distilled water were then added. Two layers were formed. The organic layer amounting to 460 ml. was separated from the aqueous layer and washed twice with 200 ml. portions of a 2 N aqueous solution of sodium hydroxide and once with 300 ml. of water, the washings being separated and combined with the original aqueous layer. The combined aqueous layers were then acidified with hydrochloric acid diluted to about 2 N with ice to liberate the β-diketone product. This formed an organic layer (260 ml.) and was separated off. The aqueous residue was washed three times with 100 ml. portions of ether, the extracts were combined with the organic layer, and the ether was then evaporated off, without heating, to give 390 ml. of crude methacrylylacetone.

The crude product was transferred to a separating funnel and purified by extraction twice with 500 ml. portions of an aqueous solution containing 100 gr. of ferric chloride per liter. The separated extract, which was coloured dark red, was acidified with concentrated hydrochloric acid until the colour disappeared, and then extracted successively with one 150 ml. portion and two 100 ml. portions of chloroform. The chloroform extract, after separation, was washed free of ferric ions and 50 ml. of 1 N hydrochloric acid, again separated, and the chloroform was evaporated from the organic layer, without heating, to give 30 ml. of methacrylylacetone.

Example 2

Toluene solution of sodium ethoxide was prepared out of 23 gr. of metal sodium in 250 ml. of sodium-dried toluene, and 46 gr. of absolute ethyl alcohol in 100 ml. of toluene. The solution was cooled in ice and 600 ml. of stabilised ethyl methacrylate were being added under stirring during 15 min. 58 gr. of acetone were then introduced gradually and the process was further on carried out in the same manner as described in Example 1. 145 gr. of crude methacrylylacetone were obtained.

The crude product was distilled under reduced pressure. The main fraction consisting of almost pure methacrylylacetone passed over at 51.0 to 51.4° C. and 5 mm. Hg. Methacrylylacetone was obtained in an amount equal to 28% of the theoretical yield.

The methacrylylacetone prepared in the above examples was found to react with ferric ions to give a blood-red ferric complex. On standing at room temperature it polymerised spontaneously. By carrying out the polymerisation in the presence of a cross-linking agent an ion-exchange resin could be produced which had selective ion-exchange properties for ferric ions. By treatment with acid the ferric ions could be displaced both from the complex with the monomer and from the polymer by hydrogen ions.

The cross-linked polymer of methacrylylacetone is an example of the general class of ion-exchange resins selective to ferric ions according to the invention. These resins are the products of the polymerisation of β-diketones according to the invention, with a cross-linking agent containing two polymerisable double bonds. Examples of suitable cross-linking agents are ethylene glycol dimethacrylate, divinyl benzene and divinyl ketone. The resins are insoluble in water.

The β-diketones may be copolymerised with the cross-linking agent either alone or in the presence of another monomer having a polymerisable double bond, preferably one containing ion-exchange groups, e.g. methacrylic acid, and the latter mainly in order to improve the physical or chemical properties of the ion-exchange resin, e.g. to increase the rate of exchange by making the resin more hydrophilic. The co-polymerisation may occur spontaneously on standing, or it may be promoted by heating. It may also be promoted or accelerated by the addition of a polymerisation catalyst, preferably other than these of the peroxide type, e.g. azo-bis-iso-butyronitrile. The polymerisation may be carried out in bulk, in which case the resin produced must be granulated before use, or it may be carried out in suspension in water.

The following example illustrates the production of an ion-exchange resin according to the invention by cross-linking methacrylylacetone with ethylene glycol dimethacrylate.

Example 3

5 ml. of crude methacrylylacetone were mixed with 0.5 ml. of ethylene glycol dimethacrylate and 2.5 ml. of water and the mixture heated to 70° C. on the water-bath. The mixture readily polymerised to a hard polymer, some of the water remaining.

The polymer was granulated and sieved to give particles passing through 14 mesh B.S.S. sieve but retained on a 52 mesh sieve, and was found to absorb ferric ions from aqueous ferric chloride solution and to liberate them again on treatment with 4 N hydrochloric acid.

The following example illustrates the production of a resin by copolymerising a mixture of methacrylylacetone and methacrylic acid with divinyl ketone as cross-linking agent.

Example 4

6.3 gr. of methacrylylacetone, 8.6 gr. of methacrylic acid and 1.5 gr. of divinyl ketone were mixed and 0.164 gr. of azo-bis-iso-butyronitrile were dissolved in the mixture. 8.6 gr. of water were then added and the mixture heated in a sealed tube overnight. A hard mass of solid polymer was produced. This product was broken up and sieved as in the previous example. It absorbed ferric ions from an aqueous ferric chloride solution and liberated them again on treatment with 4 N hydrochloric acid.

What we claim is:

1. As novel compounds the unsaturated beta-diketones having the general formula:

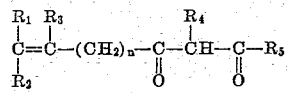

wherein $R_1$ and $R_2$ are radicals selected from the group consisting of hydrogen and alkyl radicals having not more than 4 carbon atoms; $R_3$ is a radical selected from the group consisting of hydrogen, chlorine and alkyl radicals having not more than 4 carbon atoms; $n$ is an integer between 0 and 4; $R_4$ is a radical selected from the group consisting of hydrogen and alkyl radicals having not more than 3 carbon atoms; and $R_5$ is an alkyl radical having not more than 4 carbon atoms.

2. Novel diketones in accordance with claim 1 wherein $R_1$, $R_2$ and $R_4$ are hydrogen radicals, $n$ is 0 and $R_5$ is a methyl radical.

3. Methacrylyl acetone.

4. A process of making the unsaturated beta-diketones in which a ketone having the general formula

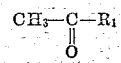

is condensed, by a low temprature Claisen condensation reaction in the presence of an alkaline polymerization inhibitor, with an agent selected from the class consisting of unsaturated aliphatic acids having the general formula

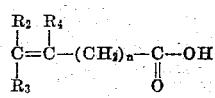

where $R_1$ is an alkyl radical having not more than 4 carbon atoms, $R_2$ and $R_3$ are selected from the group consisting of hydrogen and alkyl radicals having not more than 4 carbon atoms, and $R_4$ is selected from the group consisting of hydrogen, chlorine and alkyl radicals having not more than 4 carbon atoms, and $n$ is an integer from 0 to 4, and esters thereof.

5. A process of making methacrylyl acetone in which acetone is condensed, by a low temperature Claisen condensation reaction in the presence of an alkaline polymerization inhibitor, with an ester of methacrylic acid.

6. A process of purifying a crude unsaturated beta-diketone having the general formula set forth in claim 1 and containing impurities incident to its manufacture and which unsaturated β-diketone is reactive to ferric ions, comprising converting it to its ferric ion complex by treatment with an aqueous solution containing ferric ions, separating the aqueous phase of the ferric ion complex from organic impurities and decomposing the complex by treatment with acid.

7. An ion-exchange resin consisting of a polymer of an unsaturated beta-diketone having the general formula set forth in claim 1, which resin possesses a complexing affinity for ferric ions.

8. An ion-exchange resin consisting of a polymer of methacrylyl acetone, which resin possesses a complexing affinity for ferric ions.

9. An ion-exchange resin according to claim 7 obtained from a mixture containing from 80 to 99.95% by weight of the unsaturated beta-diketone having the general formula set forth in claim 1 and 0.05–20% of a cross-linking agent selected from the group consisting of ethylene glycol dimethacrylate, divinyl benzene and divinylketone.

10. An ion-exchange resin consisting of a copolymer of a mixture containing from 1 to 10 parts by weight of an unsaturated beta-diketone having the general formula set forth in claim 1, which resin possesses a complexing affinity to ferric-ions and 1 to 10 parts by weight of a monomer having a polymerisable double bond.

11. An ion-exchange resin consisting of a copolymer of a mixture containing from 1 to 10 parts by weight of the methacrylylacetone and 1 to 10 parts by weight of a monomer having a polymerisable double bond.

12. An ion-exchange resin according to claim 11 in which the monomer is selected from the group consisting of acrylic acid and substituted acrylic acids.

13. A process for the selective removal of ferric ions from an aqueous solution comprising treating the solution with the ion-exchange resin of claim 7 and regenerating the resin from time to time by treating it with acid.

14. An ion exchange resin possessing a complexing affinity for ferric ions, which resin is obtained by polymerizing a mixture containing from 80 to 99.95 percent by weight of methacrylylacetone and from 0.05 to 20 percent by weight of a cross-linking agent which is selected from the group consisting of ethylene glycol dimethacrylate, divinylbenzene, and divinyl ketone.

15. An ion exchange resin consisting of a copolymer of a mixture containing from 1 to 10 parts by weight of methacrylylacetone, from 1 to 10 parts by weight of a monomer selected from the group consisting of acrylic acid and substituted acrylic acids, and a cross-linking agent selected from the group consisting of ethylene glycol dimethacrylate, divinylbenzene and divinyl ketone.

References Cited in the file of this patent

UNITED STATES PATENTS

| | | |
|---|---|---|
| 2,448,958 | Clifford | Sept. 7, 1948 |
| 2,484,501 | Hagemeyer | Oct. 11, 1949 |
| 2,750,418 | Kaas | June 12, 1956 |
| 2,834,811 | Georgieff | May 13, 1958 |

OTHER REFERENCES

Wagner, "Synthetic Organic Chemistry," p. 342, Chapman Hall (1953).

Ryan, J. Chem. Soc., 104, I, pp. 1067–8 (1914).

Whitmore, "Organic Chemistry," p. 427–432, Van Nostrand (1937).